United States Patent [19]

Wang et al.

[11] Patent Number: 5,049,320

[45] Date of Patent: Sep. 17, 1991

[54] GAS DISSOLVING SYSTEM AND METHOD

[75] Inventors: Lawrence K. Wang, Latham, N.Y.; Lubomyr Kurylko, New Providence, N.J.; Mu Hao S. Wang, Latham, N.Y.

[73] Assignee: International Environmental Systems, Inc., Pittsfield, Mass.

[21] Appl. No.: 547,982

[22] Filed: Jul. 3, 1990

[51] Int. Cl.$^5$ ............................................. B01F 3/04
[52] U.S. Cl. ................................................. 261/122
[58] Field of Search ....................................... 261/122

[56] References Cited

U.S. PATENT DOCUMENTS

| | | | |
|---|---|---|---|
| 1,677,265 | 7/1928 | Boving | 261/122 |
| 1,937,434 | 11/1933 | Piatt | 261/122 |
| 1,971,852 | 8/1934 | Goebels | 261/122 |
| 3,118,958 | 1/1964 | White | 261/122 |
| 3,400,818 | 9/1968 | Tarjan | 261/DIG. 75 |
| 3,775,314 | 11/1973 | Beitzel et al. | 261/DIG. 75 |
| 4,215,081 | 7/1980 | Brooks | 261/122 |
| 4,333,829 | 6/1982 | Walther | 261/122 |
| 4,735,709 | 4/1988 | Zipperian | 261/122 |
| 4,838,434 | 6/1989 | Miller et al. | 261/122 |

FOREIGN PATENT DOCUMENTS

| | | | |
|---|---|---|---|
| 2106660 | 9/1971 | Fed. Rep. of Germany | 261/122 |
| 694918 | 7/1953 | United Kingdom | 261/122 |

OTHER PUBLICATIONS

The U.S. Dept. of Commerce, National Technical Information Service (NTIS), Report #PB 83-127704, (1982), by L. K. Wang.

Journal American Water Works Association, Jun., (1982), by M. Krofta & L. K. Wang.

Primary Examiner—Tim Miles
Attorney, Agent, or Firm—Lawrence K. Wang

[57] ABSTRACT

An improved gas dissolving and releasing system involving the use of multistages of porous gas dissolving media at the center and near the wall of a pressure vessel is described. The gas dissolving system includes a liquid pressure pump, a pressure vessel with tangential inlet and outlet, a gas injector, an inlet nozzle assembly, a center gas dissolving tube, one or more wall-mounted gas dissolving plate assembly, a gas compressor, gas regulators, gas flow meter(s), pressure gauge(s), safety valve(s), sight tube(s), a bleed-off point, a pressurized water release unit, and a liquid flow meter. The liquid flow pattern inside of the pressure vessel is controlled to be of either swirling upflow, swirling downflow or swirling horizontal flow at a rotation speed of over 2,500 rpm. A set of special nozzles with different orifices is designated for precise liquid flow control and liquid rotation speed control. More than one gases introduced at different inlets are dissolved simultaneously and efficiently in the pressure vessel under controlled pressure at 2-7 atm. The improved gas dissolving system is compact, simple and cost-effective, and is applied to ozonation, chlorination, recarbonation, oxygenation, nitrogenation, aeration, and flotation processes.

8 Claims, 5 Drawing Sheets

VIEW A-A

VIEW B-B

VIEW C-C

SIDE VIEW

TOP VIEW

GAS DISSOLVING SYSTEM AND METHOD

BACKGROUND OF THE INVENTION

The present invention relates to a method and an apparatus for dissolving gases into liquid phases under high pressure, ranging from 2 to 7 atmospheric pressure, in an enclosed pressure vessel. Conventional bubble separation, recarbonation, aeration, and ozonation technologies have a low efficiency for gas dissolution and require a long retention time, and large reactors. The present invention represents a highly efficient alternative to conventional gas dissolution methods in bubble separation, recarbonation, aeration and ozonation reactors.

The Adsorptive bubble separation process (including dissolved air flotation, dispersed air flotation, froth flotation, etc.) is a very effective technology for solid-liquid separation that has been in use outside the environmental engineering field for more than 50 years. Originally applied in the field of mining engineering, adsorptive bubble separation now provides the means for separation and/or concentration of 95 percent of the world's base metals and other mineral compounds. Recently, the adsorptive bubble separation process has become increasingly important in such diverse applications as the separation of algaes, seeds, or bacteria from biological reactors, removal of ink from repulped paper stock, recovery of wool fat from food processing streams, peas from pea pods, coal from slate, gluten from starch, oils from industrial effluents, and more recently in drinking water, cooling water, wastewater, and sludge treatments.

Adsorptive bubble separation process may be defined as the mass transfer of a solid from the body of a liquid, to the liquid surface by means of bubble attachment. The solids are in dissolved, suspended and/or colloidal forms. The three basic mechanisms involved are bubble formation, bubble attachment and solids separation. In general, the light weight suspended solids, such as fibers, activated sludge, free oil, chemical flocs, fats, etc., can be readily separated by the process in accordance with physical-chemical bubble attachment mechanism. The colloidal solids, soluble organics, soluble inorganics, and surface active substances are separated from the bulk liquid by the bubble separation process after they are converted from colloidal or soluble form into insoluble form (i.e. suspended solids) which can then be floated by bubbles.

Alternatively, the soluble surface active substances can be separated easily by an adsorptive bubble separation process in accordance with surface adsorption phenomena. Nonsurface active suspended solids, colloidal solids, soluble organics and soluble inorganics can all be converted into surface active substances. All surface active substances in either soluble or insoluble form can be effectively floated by fine gas bubbles. Production of fine gas bubbles for bubble separation is a difficult engineering task. Conventional methods and apparatus for the production of fine bubbles is similar to an inefficient pressure spray can, which requires over 2 minutes of detention time and over 50 psig pressure. A high horsepower gas compressor for gas dissolving is a necessity for the conventional gas dissolving system.

Conventional recarbonation, aeration and ozonation processes all involve the use of inefficient porous plates or gas diffusers for the introduction of carbon dioxide gas, air or ozone gas into an aqueous phase under atmospheric pressure and low liquid gravimetric pressure. Since bubble sizes are big and non-uniform, many gas bubbles are not able to completely dissolve into the aqueous phase and one, therefore, wasted in the gas stream. In cases where ozone gas is used, the residual ozone gas in the gas stream may create an air pollution problem.

The present invention is an enclosed highly efficient pressure vessel, including a porous gas dissolving tube and porous gas dissolving plate assemblies which are specifically designed to dissolve air, oxygen, nitrogen, carbon dioxide, ozone, other gases, or combinations thereof into a liquid stream, such as water, under high pressure (2 to 7 atmospheric pressure) and high rotation velocity (over 2,500 rpm). The swirling flow pattern, special nozzles, and porous gas dissolving means combine to achieve 100 percent gas dissolution in liquid and in turn eliminate the problem of a waste gas stream. The detention time needed for gas dissolving is reduced to a few seconds, therefore, the required size of the gas dissolving pressure vessel is significantly reduced. With the new system, a gas compressor becomes a supplemental means for the enhancement of gas dissolving and is no longer absolutely required.

DESCRIPTION OF THE PRIOR ART

The method of dissolving volumetric gases into the liquid stream through a liquid-gas mixing vessel of porous gas diffusion tubes, nozzles, porous gas diffusion plates, or mechanical mixers is well known in the field of gas transfer. As the gas bubbles are released into the liquid phase through one of the liquid-gas mixing vessels, only a small fraction of gases becomes soluble in the liquid. The remaining large fraction of gases remains in gaseous form and forms large gas bubbles (over 250 microns in diameter) in the liquid because of gas diffusion created by shearing forces under mainly atmospheric pressure.

Accordingly, at a conventional activated sludge sewage treatment plant, the oxygen transfer efficiency from gas phase into liquid phase is less than 50 percent because diffused coarse air bubbles are supplied to the plant's aeration basins.

At a water softening plant, a swarm of diffused coarse carbon dioxide bubbles are supplied to the recarbonation process unit, again under atmospheric pressure, for precipitation of excessive soluble calcium ions, but only a small amount of carbon dioxide bubbles are chemically effective; the remaining carbon dioxide bubbles are wasted into the ambient air. The bubbles cause no short-term problems, but are contributing to undesirable global warming, the so-called greenhouse effect, in the long run.

Ozone gas is an excellent disinfectant as well as an oxidation agent which is commonly introduced into a liquid stream through a diffuser under nearly atmospheric pressure or negative pressure. This is the well known ozonation process. Any excessive ozone gas escaped from the liquid stream due to poor dissolution contributes to air pollution and also represents an unnecessary waste.

Diffused air flotation, froth flotation, and foam separation are all conventional adsorptive bubble separation processes, in which coarse air bubbles (with a diameter much greater than 250 microns) are generated under nearly atmospheric pressure in one of the liquid-gas mixing vessels. A swarm of coarse air bubbles amounting to 400 percent of the liquid's volumetric flow creates turbulence in the liquid stream, and also provides a large air-to-liquid interface area that allows soluble surface active substances to be separated from the original liquid phase and form a foam or froth phase on the liquid surface.

Dissolved air flotation is an innovative adsorptive bubble separation process, in which extremely fine air bubbles (with diameter less than 80 microns) are required for separation of mainly insoluble suspended solids from the original liquid phase into a thickened scum phase on the liquid surface. The ratio of air volume to liquid volume is only about 1 to 3 percent.

In order to facilitate the aeration, recarbonation, ozonation and dissolved air flotation processes, generation of extremely fine gas bubbles is required, and can be effectively done under high pressure (2 to 7 atmospheric pressures) by the present invention.

Prior apparatus for a compressed air operation is described in U.S. Pat. No. 1,677,265 issued July 17, 1928 to Jens Orten Boving, which relates to liquid pumps of the air-lift type, i.e. of the type in which the liquid is raised in an uptake or ascension pipe by means of compressed air admitted to the pipe at or near its lower end. This patent is particularly directed to an air-lift pump using compressed air still in gaseous form, rather than to a pressure vessel for air dissolution as is the case of the present appliation. However, it is important to illustrate the development of the air compression art leading to the present disclosure.

A prior apparatus for a compressed air operation applicable to aeration of activated sludge in a sewage treatment plant is described in U.S. Pat. No. 1,937,434 issued Nov. 28, 1933 to William M. Piatt. This patent is particularly directed to an improved compressed air diffusion using a liquid-gas mixing vessel of porous gas diffusion tubes and porous gas diffusion plates. Coarse air bubbles form an upward or horizontal swirling pattern in the liquid in an open tank under normal environmental pressure, and total vessel volume is the summation of liquid volume and gas bubble volume. The present invention utilizes a pressure vessel for total dissolution of air bubbles (not distribution and generation of air bubbles) under high pressure ranging 2 to 7 atm. Since the swirling pattern of flow in the present invention is for elimination of all air bubbles in the pressure vessel, rather than for generation a swarm of coarse bubbles in an open tank, as is the case of the Piatt's patent, the total pressure vessel volume of the present invention is equal to the liquid volume, and there is no gas flow out of the pressure vessel.

Apparatus for stirring up farinaceous materials in receptacles of any kind by compressed air or other compressed gas is shown in U.S. Pat. No. 1,971,852 issued Aug. 28, 1934, to Paul Goebels. This 1934 patent discloses an improved mixing device using both porous plates and porous tubes for mixing of substances in a container under normal atmospheric pressure of 1. The present invention, however, discloses an improved gas dissolution pressure vessel using porous gas dissolving tubes and porous gas dissolving plates for soluble gas dissolution under high pressure, dissolving either compressed gas or non-compressed gas in liquid and eliminating gas bubbles after passing through the porous media. The Goebel's patent relates to an apparatus using compressed air or other gases for mixing purposes and the air or other gases becomes gas bubbles after passing through the porous diffusion media.

Still another apparatus for diffusing gases through porous media is shown in U.S. Pat. No. 3,118,958 issued Jan. 21, 1964, to John W. White. Specifically, White's patent relates to an improved apparatus for continuous production of cellular products which incorporates a micro-porous plate through which a gas is passed in uniform and correct amounts into the material to be formed, and the gas remains in gaseous form. The present invention relates to an improved apparatus for continuous complete dissolution of gas into liquid under pressure, and the gas is no longer in gaseous form in the pressure vessel after passing through the porous gas dissolving tube and plates.

Still another apparatus for diffusing gases through porous media is shown in U.S. Pat. No. 3,400,818 issued Sept. 10, 1968 to Gusztav Tarjan. This patent discloses a froth flotation cell which is provided a static vortex inducer unit to which is fed a slurry of material to be separated and air to be dispersed therein, under normal environmental pressure forming a swarm of coarse bubbles. The present invention discloses a pressure vessel in which the gas is dissolved in liquid, forming no bubbles, no foams, and no froths, in the pressure vessel in which porous media are provided.

The method and apparatus for mixing ozone with water in an ozonation process is disclosed by Stuart W. Beitzel et al in their U.S. Pat. No. 3,775,314 issued Nov. 27, 1973. Their patent discloses a new technology by which a whirling mass of fluid in a high pressure zone is injected into a body of water to be purified. The body of water has a pressure lower than that in the high pressure zone, thereby creating in the body of water a partial vacuum zone containing water and water vapor. Introducing ozone and/or oxygen gas at a pressure of less than about 15 psi into the partial vacuum zone, causes the formation of bubbles of the gas in the water. The present invention relates a pressure vessel which completely dissolves ozone and/or oxygen in highly pressurized water at 30-100 psi, and is never under a vacuum environment.

Many U.S. Pat. Nos. (3,820,659 issued to Parlette in June, 1974; 4,022,696 issued to Krofta in May, 1977; 4,303,517 issued to Love et al in December, 1981; 4,377,485 issued to Krofta in March, 1983; 4,626,345 issued to Krofta in December, 1986; and 4,673,494 issued to Krofta in June, 1987) disclose water and wastewater treatment apparatus using dissolved air flotation. While the dissolved air flotation process requires extremely fine air bubbles to increase its treatment efficiency, these patents disclose only improved flotation cells without enclosures (i.e. under normal pressure), but do not disclose any enclosed pressure vessel for dissolved air flotation process optimization. The present invention relates an improved apparatus for complete dissolution of various gases for specific optimization applications: ozone for ozonation, carbon dioxide for recarbonation, air for both aeration and dissolved air flotation, and oxygen for oxygenation. In each application, the apparatus disclosed in the present invention produces extremely fine gas bubbles with diameters less than 80 microns.

An apparatus for dissolving a gas such as air into a liquid, under normal one atmospheric pressure, utilizing a submerged tube provided with a means for injecting the gas into the lower end thereof and for inletting liquid into the tube at various locations throughout the length thereof is disclosed in U.S. Pat. No. 4,215,081 issued July 29, 1980 to Kirtland H. Brooks. The applications of Brook's patent and of the present invention are both for dissolving gas. However, the Brook's patent relates to a gas dissolving apparatus without any porous tubes or plates, and being operated under normal one atmospheric pressure for partial gas dissolution due to the fact that a majority of gas remains in gaseous form as bubbles. The present invention relates to an improved gas dissolving apparatus using porous tubes and porous plates and being operated under 2 to 7 atmospheric pressure for total gas dissolution, without forming gas bubbles in the pressure vessel.

An apparatus for removing foreign matter form the top surface of water, for use with aquaria, which comprises a discharge tube stationarily disposed in the aquarium and having its upper opening rim below the water surface, is disclosed in U.S. Pat. No. 4,333,829 issued June 8, 1982 to Gerhard Walther. Specifically, Walther's patent relates to an apparatus using coarse bubbles generated by porous media for removing foreign matter under normal pressure. The porous media disclosed in the present invention are used to dissolve gas in a pressure vessel, not under normal pressure and not for coarse bubble generation.

Another prior apparatus for froth flotating is described in U.S. Pat. No. 4,735,709 issued Apr. 5, 1988 to Donald E. Zipperian. This patent discloses a froth flotation system for separating a mineral fraction from an aqueous pulp containing a mixture of mineral and particles. It is accomplished by bubbling gas bubbles into the pulp in an open vessel under normal environmental pressure by two different means that diffuse compressed gas through porous micro diffusers for bubble generation and, in turn, for froth generation. The present invention relates to a pressure vessel in which gas through porous media is totally dissolved (i.e. not for bubble formation) in said pressure vessel under high pressure and over 2,500 rpm rotation velocity created by nozzle control and vessel diameter control. Besides, no froth is involved in the present invention.

Still another prior apparatus for froth flotation is described in U.S. Pat. No. 4,838,434 issued June 13, 1989 to Jan P. Miller et al. Their patent also discloses a froth flotation system in which porous plates are used for bubble generation and froth formation under normal environmental pressure, and in which a tangential inlet is wide open for influent flow coming in by gravity. The present invention relates to a pressure vessel in which porous plates and porous tubes are used for bubble elimination (i.e. total gas dissolution) under extremely high pressure ranging from 2 to 7 atmospheric pressure, and in which a tangential inlet and outlet pair with nozzle control at over 2,500 rpm rotation velocity further facilities gas dissolution in a totally enclosed vessel.

Theories and principles of oxygenation, ozonation, aeration, gas dispersion and bubbles generation are fully disclosed by Wang (U.S. NTIS No. PB83-127704-AS, September, 1982), and Krofta and Wang (Journal American Water Works Association, Vol. 74, No. 6. P. 304-310, June, 1982). The oxygenation and ozonation system disclosed by Wang (U.S. NTIS No. PB83-127704-AS, September, 1982) relates to a hyperbaric reactor vessel into which both oxygen and ozone gases are pumped and diffused together through the same porous plate for simultaneous chemical reaction. The hyperbaric reactor vessel is 50 percent full of liquid, and 50 percent full of compressed gases. The gas transfer inside of said hyperbaric reactor vessel is accomplished by a recirculation pump which sprays the liquid into the compressed gas phase. The present invention is an improved oxygenation and ozonation system into which both oxygen and ozone gases are distributed separately through a porous plate and a center porous tube for chemical reactions. The present inventors' pressure vessel is full of liquid in which gases are soluble. The total dissolution of the gas inside of the pressure vessel is accomplished by the improved nozzle assembly that gives over 2,500 rpm of swirling rotation velocity surrounding the center porous tube, and fast linear velocity passing the porous plate. In addition, the present invention involves the use of separate porous means for dissolution of different gases at desired locations for desired chemical reactions.

SUMMARY OF THE INVENTION

In accordance with the present invention, an improved method and apparatus for dissolving various gases into a liquid stream under high pressure and high rotation velocity in accordance with a swirling flow pattern surrounding a center gas dissolving tube inside a pressure vessel, comprises the following steps, facilities and alterations:

pumping the liquid stream (i.e. water or other liquid solvent) through a gas injector loop and a liquid nozzle assembly into a pressure vessel, which has liquid inlets, liquid outlets, gas inlets, gas outlets, a center gas dissolving tube, at least one wall-mounted gas dissolving plate assembly, gas regulators, gas flow meters, pressure gauges, safety valves, a sight tube, a bleed-off point, cover plates and a cylindrical outside wall, choosing an upward swirling flow pattern, a downward swirling flow pattern or a horizontal swirling flow pattern for the pressure vessel which is operated at a rotation speed of over 2,500 rpm surrounding said center gas dissolving tube to dissolve gases to conform to different process applications, adjusting the gas dissolving contact time and contact pressure of said pressure vessel, to conform to different gases and liquids, adjusting a set of special nozzle assembly with different orifices for precise liquid flow control and liquid rotation speed control of said pressure vessel, dissolving more than one gases simultaneously and efficiently in said pressure vessel under controlled pressure and swirling flow pattern for specific applications: ozonation, oxygenation, nitrogenation, chlorination, aeration, and recarbonation (carbonation), and releasing the pressurized effluent from said pressure vessel.

BRIEF DESCRIPTION OF THE DRAWINGS

The present invention will become more fully understood from the detailed description given hereinbelow and the accompanying drawings which are given by way of illustration, and thus are not limitative of a present invention, and wherein:

FIG. 1 presents the side view while FIG. 1A, FIG. 1B and FIG. 1C present three cross-sectional views (A—A, B—B and C—C, respectively) of the pressure vessel according to the present invention;

DESCRIPTION OF THE PREFERRED EMBODIMENTS

Figure 1:
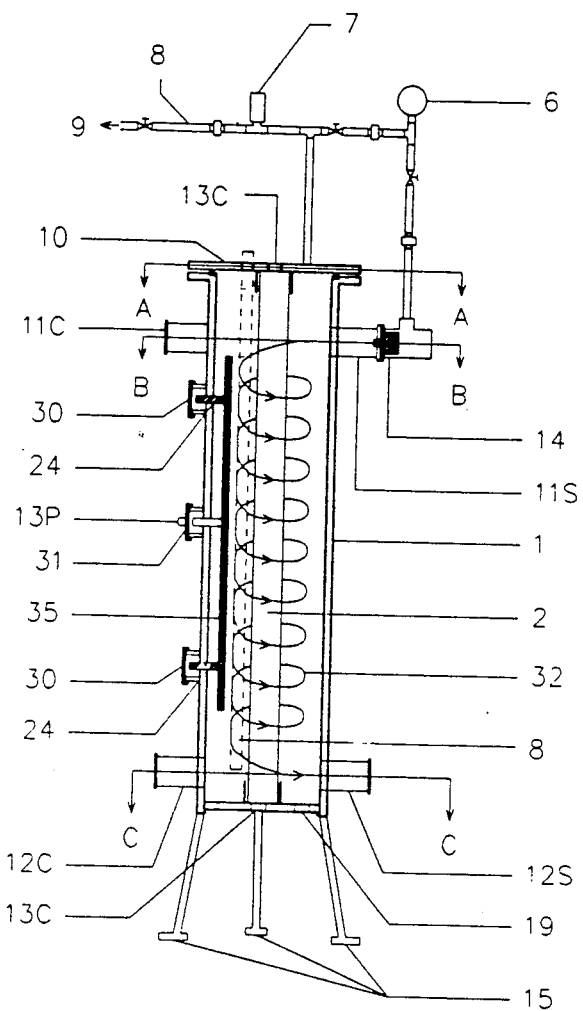
Figure 1:
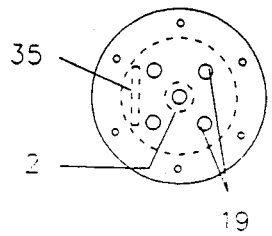
Figure 1:
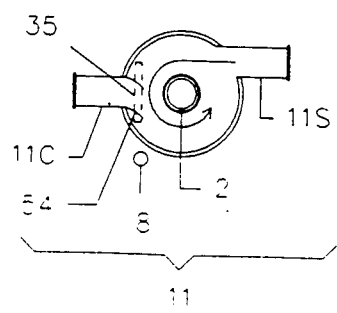
Figure 1:
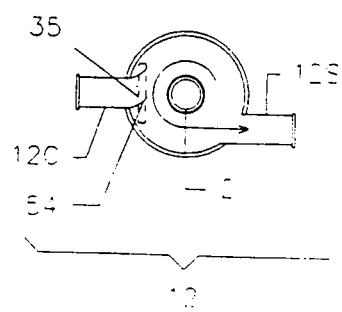
Figure 2:
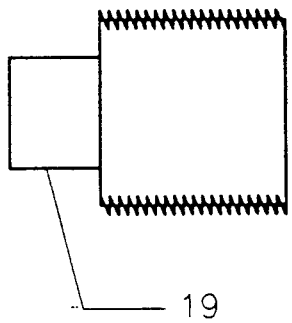
FIG. 2A, FIG. 2B and FIG. 2C show a plug, a regular nozzle and a cone nozzle, respectively, of the apparatus according to the present invention.
Figure 2:
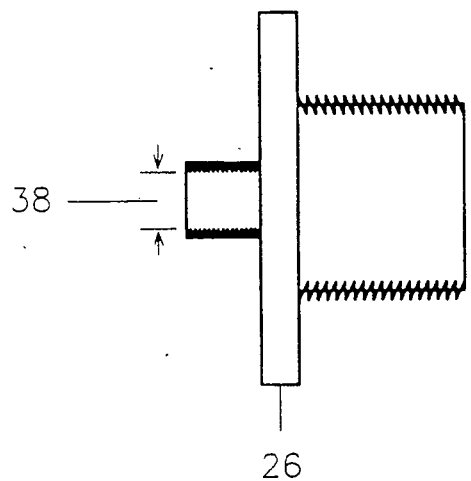
Figure 2:
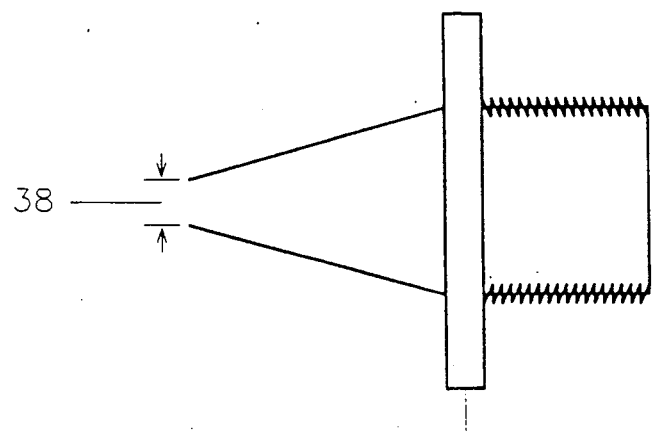
Figure 3:
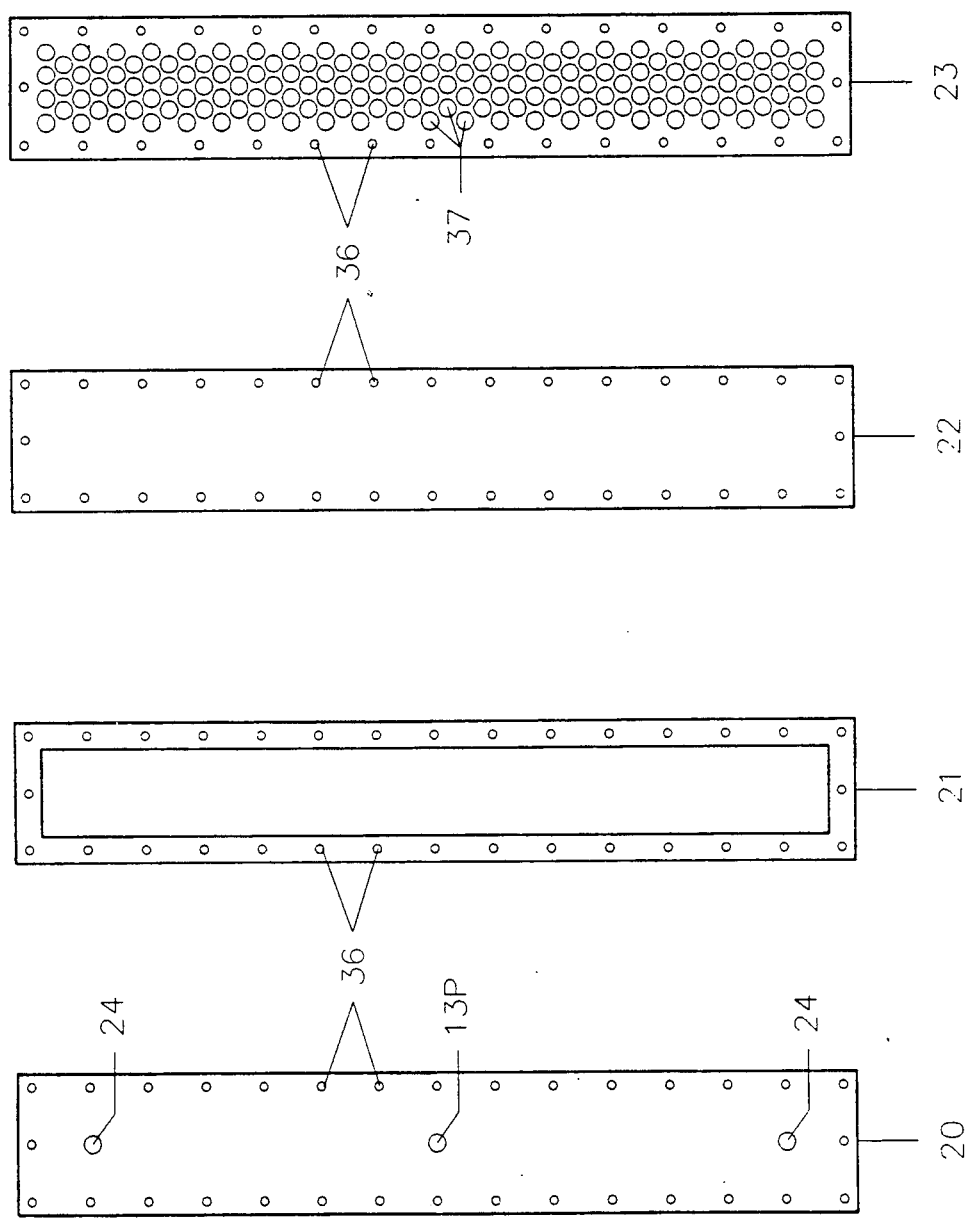
FIG. 3A, FIG. 3B, FIG. 3C and FIG. 3D show a solid metal bottom, a rubber frame, a porous filter and a filter support, respectively, for construction of a wall-mounted porous gas dissolving plate assembly inside said apparatus according to the present invention.

FIG. 1 to FIG. 5B inclusive are a set of schematic diagrams of the present invention when applied to dissolving gases (solutes) into water (a solvent) in a swirling flow pattern resulting centrifugal force and over 2,500 rpm of liquid rotation velocity. Many gaseous solutes, liquid solvents and flow patterns can also be applied to the present invention.

Referring to FIG. 1, FIG. 1A, FIG. 1B, FIG. 1C, FIG. 5A and FIG. 5B, the pressure vessel 1 is equipped with a porous center gas dissolving tube 2, at least one wall-mounted porous gas dissolving plate assembly 35, two caps 30 for threaded bolts 24, a cap 31 for the gas inlet 13p, a gas compressor (not shown), a gas regulator equipment 4, a gas meter 5, a pressure gauge 6, a safety valve 7, a sight tube 8, a bleed-off point 9, a top cover plate 10, a liquid inlet section 11, a liquid outlet section 12, multiple gas inlets 13p and 13c, a liquid nozzle assembly 14 and three standing legs 15.

Referring to FIGS. 5A and 5B, the liquid stream 16 is pumped by a pressure pump 17 through a gas injector loop 18, a recirculation loop 25 and a nozzle assembly 14 into the pressure vessel 1, where the gaseous solutes are introduced through said porous center gas dissolving tube 2 and said porous gas dissolving plate assembly 35 and are subsequently dissolved into the liquid stream under high pressure 2-7 atm., and a swirling flow pattern 32 with centrifugal force and a rotation velocity over 2500 rpm. The liquid containing a high concentration of gaseous solutes, is discharged from said pressure vessel 1 from the liquid outlet section (12s or 12c). Normally only the side liquid inlet 11s and side liquid outlet 12s are used, and the center liquid inlet 11c and the center liquid outlet 12c are blocked with plugs 19.

FIG. 2A schematically illustrates the plugs 19 for the used center liquid inlet 11c and the unused center liquid outlet 12c. illustrated in FIG. 2B and FIG. 2C are a typical regular nozzle 26 and a cone nozzle 27, respectively, to be used for precise liquid flow control by the nozzle assembly 14, shown in FIG. 1.

The wall mounted porous gas dissolving plate assembly 35 in FIG. 1 is further amplified in FIGS. 3A-3D and FIG. 4. FIGS. 3A, 3B, 3C and 3D show that the porous gas dissolving plate assembly 35 comprises a solid metal bottom 20, a rubber frame 21 on the top of the solid metal bottom, a porous filter plate 22 on the top of the rubber frame, and a filter support 23 on top of the porous filter plate, respectively. The filter support 23 in FIG. 3D has a desirable number of distribution holes 37. The mounting holes 36 for the solid metal bottom 20, rubber frame 21, porous filter 22 and filter support 23 are identical, so the parts of entire gas dissolving plate assembly 35 can be bolted together.

Figure 4:
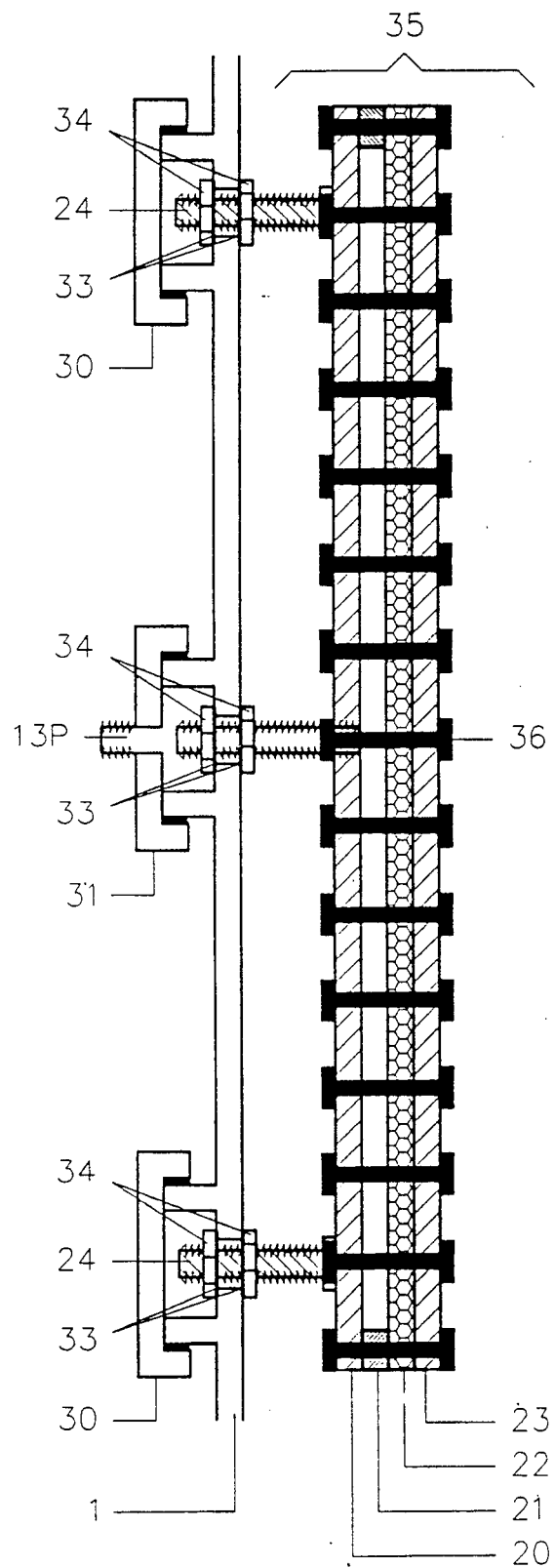
FIG. 4 indicates the side view of said wall-mounted porous gas dissolving plate assembly and the details of connection of said porous gas dissolving plate assembly to the wall of said pressure vessel.
Figure 5:
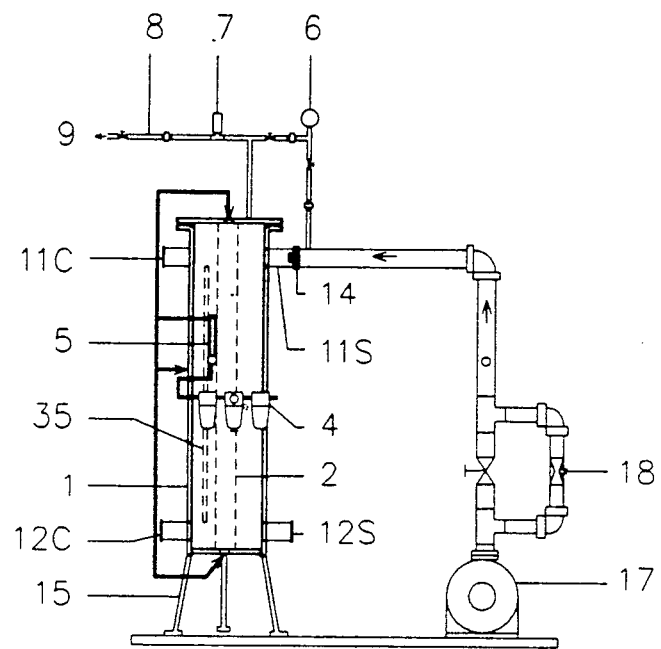
FIG. 5A and FIG. 5B show the side view and the top view, respectively, of the overall gas dissolving system including both said porous gas dissolving plate assembly and a porous center gas dissolving tube in accordance with the present invention.
Figure 5:
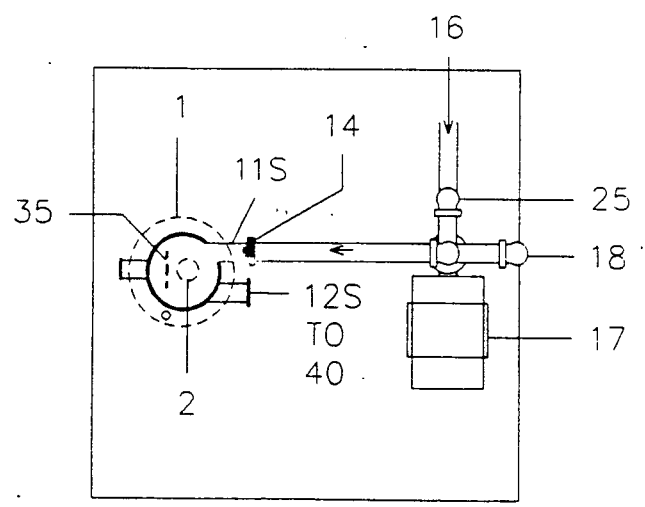

The four parts of the gas dissolving plate assembly 20,21,22 and 23 in FIGS. 3A-3D are assembled together and shown in FIG. 4 where the structures of the threaded bolts for mounting 24 and the compressed gas inlets 13p are also shown. The caps 30 of threaded bolt for mounting 24 and the cap 31 for the gas inlet pipe 13p are illustrated in both FIG. 1 & FIG. 4.

The porous center gas dissolving tube 2 in FIG. 1, and the porous filter 22 in FIG. 3C and FIG. 4 are made of a porous medium, such as stainless steel, ceramic, plastic, nylon, polyethylene, or combinations thereof.

The gas injector 18 shown in FIG. 5A and FIG. 5B introduces gas into a liquid stream by suction (i.e. negative pressure) before entering the pressure vessel 1, so a gas compressor (not shown) is a standby unit which is not absolutely required under normal gas dissolving operations.

The inlet nozzle assembly 14 shown in FIG. 1, FIG. 5A and FIG. 5B has a complete set of nozzles with various orifice diameters for precise liquid flow control and liquid rotation velocity control inside of said pressure vessel 1. As a typical example, when the water pressure before the nozzle assembly 14 is 80 psi, the water pressure after the nozzle assembly 14 and inside of the pressure vessel 1 is 72 psi, the orifice diameter 38 shown in FIG. 2B or FIG. 2C is 0.35 in., and the inside diameter of the pressure vessel is 6 in., the water flow entering the pressure vessel 1 and the rotation velocity inside are controlled to be 9.8 gpm and over 9,000 rpm, respectively.

Referring to FIG. 1, if the legs 15 of said pressure vessel 1 shown in FIG. 1 and FIG. 5A are installed on the side of the side inlet 11s, and the pressure vessel 1 is turned upside down, the swirling flow pattern 32 becomes upward instead of downward. If the legs 15 are installed along the cylindrical wall of the pressure vessel 1, the swirling flow pattern 32 becomes horizontal. Accordingly, the pressure vessel 1 can be installed and operated in accordance with a downward swirling flow pattern (as in the case of FIG. 1), an upward swirling flow pattern (not shown) or a horizontal swirling flow pattern (not shown).

Referring to FIG. 1, FIG. 5A and FIG. 5B, the inlet nozzle assembly 14 can also be connected to the center liquid inlet 11C, instead of the side liquid inlet 11S, for feeding the liquid stream 16 by a pressure pump 17 into said pressure vessel 1. Similarly the center liquid outlet 12C, shown in FIG. 1 and FIG. 5A, can be used, instead of the side liquid outlet 12S, to discharge the pressurized effluent from said pressure vessel 1.

In order to accommodate various industrial and municipal applications, the pressure vessel 1 shown in FIGS. 1, 1A, 1B and 1C can be operated with the following inlet-outlets combinations for the maximum flexibility of operation: (a) side liquid inlet 11S and side liquid outlet 12S; (b) side liquid inlet 11S and center liquid outlet 12C; (c) center liquid inlet 11C and center liquid outlet 12C; and (d) center liquid inlet 11C and side liquid outlet 12S.

Both the porous center gas dissolving tube 2 shown in FIG. 1 and the porous filter 22 for the wall-mounted porous gas dissolving plate assembly 35 shown in FIG. 4 are made of porous medium such as stainless steel, ceramic, plastic, nylon, polyethylene, or combinations thereof.

The porous center gas dissolving tube 2 can be top mounted (not shown), bottom mounted (not shown), or both top and bottom mounted as shown in FIG. 1. Referring to both FIG. 1 and FIG. 5A, more than one gases can be fed simultaneously into said pressure vessel 1 through gas inlets 13P & 13C and a gas injector loop 18 for total gas dissolving and chemical reactions in the liquid under 2 to 7 atmospheric pressure.

Since more than one gases can be dissolved simultaneously and efficiently in said pressure vessel 1 under controlled pressure, rotation velocity and swirling flow pattern, the improved apparatus is compact, simple and cost-effective, and is applied to ozonation, chlorination, recarbonation, oxygenation, nitrogenation, aeration, and flotation processes.

The present invention is specific for compressed and/or uncompressed gaseous solutes to be dispersed through a porous center gas dissolving tube 2 and one or more wall-mounted porous gas dissolving plate assembly 35 to a liquid solvent inside of a sealed pressure vessel 1 and then dissolved into said liquid solvent under a swirling hydraulic flow pattern 32 at controlled pressure liquid flow rate, gas flow rate, liquid rotation velocity, and detention time. Compressed gas addition is provided by a gas compressor (not shown) while the uncompressed gas addition is provided by a vacuum gas injector 18.

There is thus provided by the invention a gas dissolving method and apparatus which efficiently dissolves gas or gases into a selected liquid stream for various environmental engineering applications, such as aeration, oxygenation, chlorination, nitrogenation, recarbonation (carbonation), ozonation, etc. The present invention occupies a relatively small space, does not require adjusting liquid level in said pressure vessel 1, creates no air pollution, and is relatively low in cost. The apparatus is particular suitable for use in adsorptive bubble separation processes (such as dissolved air flotation, dispersed air flotation, foam separation, froth flotation, etc.).

While the present invention has been described with reference to particular embodiments thereof, it will be understood that numerous other minor modifications may be made by those skilled in the art without departing from the scope of the invention. Therefore, the following claims are intended to cover all such equivalent variations as come within the true spirit and scope of the invention.

What is claimed is:

1. An apparatus for dissolving a plurality of gases into a pressurized liquid stream for simultaneous ozonation, chlorination, recarbonation, oxygenation, nitrogenation, aeration and flotation processes comprises:

an inlet pipe with an inlet valve for the influent liquid stream to enter said apparatus, a pump forcing said influent liquid stream through a gas injector where the first gas is fed by suction under negative pressure, a liquid inlet nozzle assembly measuring the pressure and flow rate of said influent liquid stream from said gas injector and creating high liquid velocity, an enclosed cylindrical pressure vessel receiving the liquid from said inlet liquid nozzle assembly for pressurization, being equipped with a side liquid inlet pipe, a center liquid inlet pipe, a side liquid outlet pipe, a center liquid outlet pipe, a pressure gauge, a safety valve, a sight tube, a gas bleed-off valve, at least one wall-mounted gas dissolving plate assembly, a center gas dissolving tube, a plurality of gas inlets for feeding the second and the third gases, cover plates, support legs, gas regulators, and means to maintain the vessel at 2-7 atmospheric pressure, and over 2,500 rpm liquid rotation velocity in accordance with a swirling flow pattern surrounding said center gas dissolving tube for total gas dissolution, and an outlet pipe with an outlet valve for discharge of the effluent from said cylindrical pressure vessel.

2. The apparatus of claim 1 wherein said inlet nozzle assembly is a part of a complete apparatus with various nozzle orifice diameters for precise liquid flow control and liquid rotation velocity control.

3. The apparatus of claim 1 wherein said porous center gas dissolving tube is porous medium, which is made of stainless steel, ceramic, plastic, polyethylene, nylon, or combinations thereof.

4. The apparatus of claim 1 wherein said porous center gas dissolving tube is top mounted, or bottom mounted, or both top and bottom mounted.

5. The apparatus of claim 1 wherein said wall-mounted porous gas dissolving plate assembly is porous medium, which is made of stainless steel, ceramic, plastic, nylon, polyethylene, or combinations thereof.

6. The apparatus of claim 1 wherein said pressure vessel is operated in accordance with a downward swirling flow pattern, an upward swirling flow pattern or a horizontal swirling flow pattern, for the pressurized liquid inside said pressure vessel.

7. The apparatus of claim 1 wherein said pressure vessel is operated with the following inlet-outlet combinations to have maximum flexibility for various industrial and municipal applications: (a) side liquid inlet and side liquid outlet; (b) side liquid inlet and center liquid outlet; (c) center liquid inlet and center liquid outlet; and (d) center liquid inlet and side liquid outlet.

8. A method for dissolving a plurality of gases into a liquid comprises of the following steps:

pumping the liquid stream to a pressure vessel under 2 to 7 atmospheric pressure, feeding noncompressed gas into said liquid stream by suction, controlling liquid flow rate and liquid rotation velocity inside said pressure vessel with a liquid nozzle assembly, maintaining a swirling flow pattern surrounding a porous center gas dissolving tube at over 2,500 rpm inside said pressure vessel, feeding and dissolving compressed gas into the pressurized liquid inside said pressure vessel through said porous center gas dissolving tube, feeding and dissolving compressed gas into the pressurized liquid inside said pressure vessel through a wall-mounted gas dissolving plate assembly, and having ozonation, oxygenation, nitrogenation, chlorination, aeration, and recarbonation (carbonation) reactions inside said pressure vessel when ozone, oxygen, nitrogen, chlorine, air and carbon dioxide gases, respectively, are fed or present.

* * * * *